United States Patent
Susic, Jr.

(10) Patent No.: US 10,663,161 B2
(45) Date of Patent: May 26, 2020

(54) ILLUMINATED DIPSTICK

(71) Applicant: Josh Susic, Jr., Bozeman, MT (US)

(72) Inventor: Josh Susic, Jr., Bozeman, MT (US)

(*) Notice: Subject to any disclaimer, the term of this patent is extended or adjusted under 35 U.S.C. 154(b) by 0 days.

(21) Appl. No.: 16/210,096

(22) Filed: Dec. 5, 2018

(65) Prior Publication Data
US 2019/0186727 A1 Jun. 20, 2019

Related U.S. Application Data

(60) Provisional application No. 62/598,795, filed on Dec. 14, 2017.

(51) Int. Cl.
| F21V 33/00 | (2006.01) |
| F21V 23/04 | (2006.01) |
| F21V 23/00 | (2015.01) |
| G01F 23/04 | (2006.01) |
| F21S 9/03 | (2006.01) |
| F21Y 115/10 | (2016.01) |

(52) U.S. Cl.
CPC ............ F21V 33/008 (2013.01); F21S 9/035 (2013.01); F21V 23/001 (2013.01); F21V 23/04 (2013.01); F21V 33/00 (2013.01); G01F 23/04 (2013.01); F21Y 2115/10 (2016.08)

(58) Field of Classification Search
CPC ............ G01F 23/04; G01N 2021/7759; Y10S 436/81
See application file for complete search history.

(56) References Cited

U.S. PATENT DOCUMENTS

| 4,155,167 | A | * | 5/1979 | DeLano | .................. | G01F 23/04 |
| | | | | | | 33/716 |
| 5,056,821 | A | * | 10/1991 | Fierro | .................. | A63C 11/222 |
| | | | | | | 280/816 |
| 5,832,621 | A | * | 11/1998 | Pavano | .................. | G01F 23/04 |
| | | | | | | 33/722 |
| 6,869,200 | B1 | * | 3/2005 | Graham | .................. | F21V 35/00 |
| | | | | | | 362/122 |
| 2010/0154851 | A1 | * | 6/2010 | Gorey | ...................... | A45B 3/04 |
| | | | | | | 135/66 |
| 2010/0315246 | A1 | * | 12/2010 | Gilpatrick | ............... | G01F 23/04 |
| | | | | | | 340/623 |

(Continued)

*Primary Examiner* — Zheng Song
(74) *Attorney, Agent, or Firm* — Boudwin Intellectual Property

(57) ABSTRACT

A new illuminated dipstick. The illuminated dipstick has a handle and an elongated member with a first end and a second end. The first end of the elongated member extends from the handle. The second end of the elongated member is received within a fluid reservoir housing. The elongated member is composed of a heat resistant material to prevent degradation from exposure to high temperatures. The second end of the elongated member measures fluid levels within the fluid reservoir. The handle comprises a housing, a switch disposed on an exterior of the housing opposite the elongated member, a power source enclosed within a waterproof interior volume of the housing and a light source disposed on an exterior of the housing opposite the switch. The switch, the power source and the light source are operably connected to each other. The switch is configured to selectively actuate the light source.

12 Claims, 2 Drawing Sheets

(56) References Cited

U.S. PATENT DOCUMENTS

2012/0257377 A1* 10/2012 Schrimmer ............. F21L 4/027
362/119
2015/0135828 A1* 5/2015 Salter ...................... G01F 23/04
73/293

* cited by examiner

ILLUMINATED DIPSTICK

CROSS REFERENCE TO RELATED APPLICATIONS

This application claims the benefit of U.S. Provisional Application No. 62/598,795 filed on Dec. 14, 2017. The above identified patent application is herein incorporated by reference in its entirety to provide continuity of disclosure.

BACKGROUND OF THE INVENTION

The present invention relates to a dipstick. More particularly, an illuminating dipstick which provides a light source capable of illuminating the measurement end of the dipstick, thereby allowing for accurate measurement of the fluid level in little to no ambient light.

Many people use a dipstick to check the fluid levels in machines such as the engine of their automobile. Machines can incur damage if the fluid level is outside the safe operating range and goes un-detected. This damage can be exacerbated over time and the engine may eventually stop running entirely if the fluid level is not corrected.

A traditional dipstick has markings on one end which indicate a safe operating range. An individual can insert the dipstick in the compartment containing the fluid they desire to measure. The fluid adheres to the dipstick up to the height of the fluid in the compartment. The individual compares the height of the fluid to the indicator markings on the dipstick in order to determine where fluid levels fall relative to a safe operating range. Where the fluid is running low, the dipstick will alert the individual to replace the fluid before a catastrophic failure occurs.

Unfortunately, it can be difficult to read a standard dipstick at night or in other situations where inadequate lighting is present. This difficulty in reading the dipstick may result in an inaccurate reading. Some people attempt to provide their own light source via a flashlight or a headlamp, but flashlights can be difficult to hold while handling a dipstick, and headlamps are not very practical. Accordingly, a dipstick that provides a light source capable of illuminating the measurement end of the dipstick, thereby allowing for accurate measurement of the fluid level in little to no ambient light is desired.

The present invention substantially diverges in design elements from other dipsticks in the known art and consequently it is clear that there is a need in the art for an improvement to existing dipstick devices. In this regard the present invention substantially fulfills these needs.

SUMMARY OF THE INVENTION

In view of the foregoing disadvantages inherent in the known types of dipsticks now present in the known art, the present invention provides an illuminated dipstick wherein the same can be utilized for providing convenience to the user when measuring the fluid levels in a machine. The present dipstick has a handle and an elongated member with a first end and a second end, wherein the first end of the elongated member is affixed to and extending from the handle. A second end of the elongated member is received within a housing connected to a fluid reservoir. The elongated member is composed of a heat resistant material configured to prevent degradation from exposure to high temperatures. The second end of the elongated member is configured to measure fluid levels within the fluid reservoir. The handle comprises a housing, a switch disposed on an exterior of the housing opposite the elongated member, a power source enclosed within a waterproof interior volume of the housing and a light source disposed on an exterior of the housing opposite the switch. The switch, the power source and the light source are operably connected to each other. The switch is configured to selectively actuate the light source.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
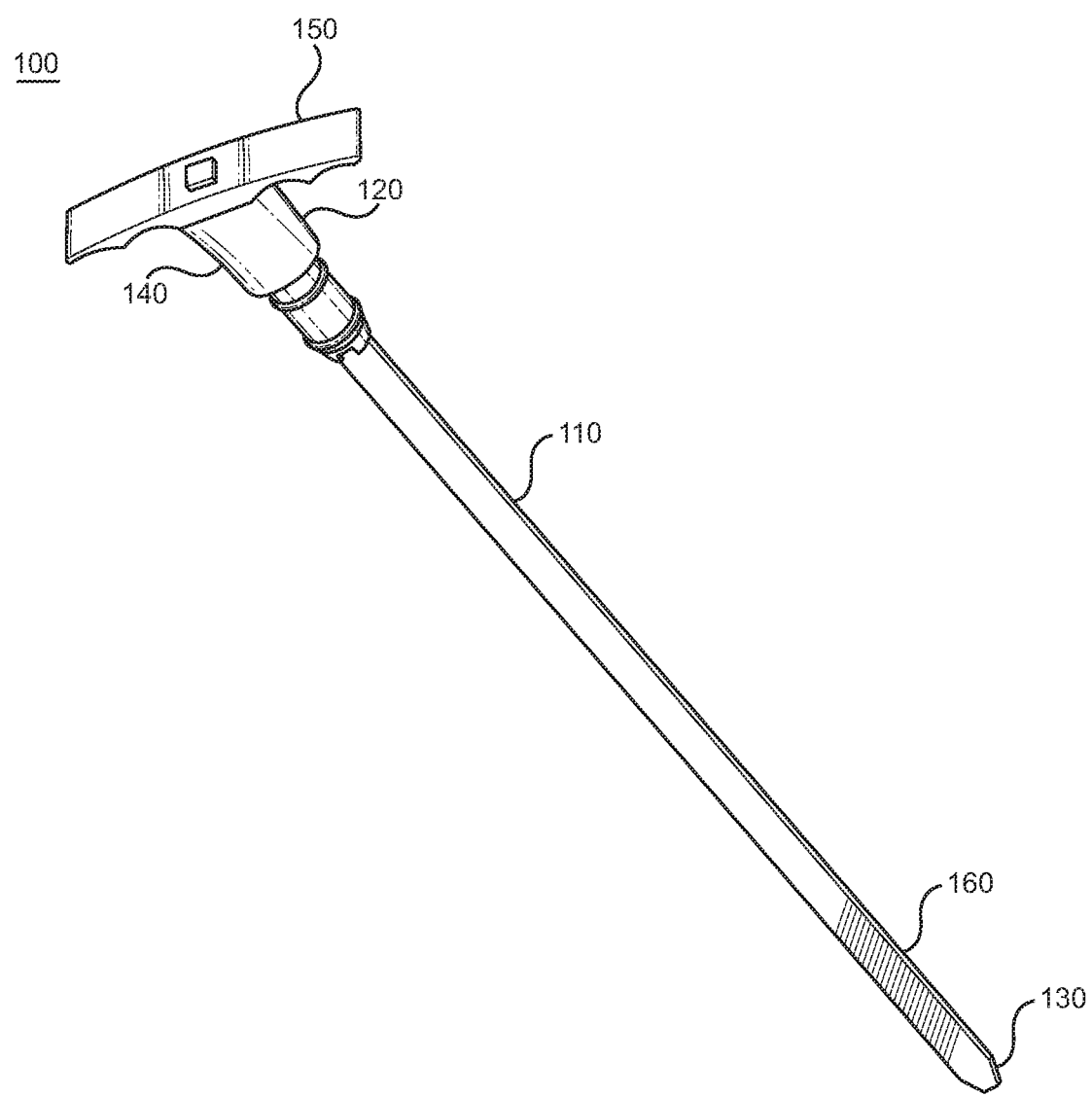
FIG. 1 shows a perspective view of an embodiment of the illuminated dipstick.

Reference is made herein to the attached drawings. Like reference numerals are used throughout the drawings to depict like or similar elements of the illuminated dipstick. For the purposes of presenting a brief and clear description of the present invention, a preferred embodiment will be discussed as used for the illuminated dipstick. The figures are intended for representative purposes only and should not be considered to be limiting in any respect.

Referring now to FIG. 1, there is shown a perspective view of an embodiment of the illuminated dipstick. The illuminated dipstick 100 comprises an elongated member 110 having a first end 120 disposed oppositely a second end 130. The elongated member 110 can be made of a heat resistant material, such that the elongated member 110 can be protected from degradation when exposed to high temperatures, such as engine heat in an automobile engine. In another embodiment, the elongated member 110 can be flexible, such that the elongated member 110 can be inserted into the fluid reservoir and remain accessible by the user when inserted into the fluid reservoir.

The first end 120 of the elongated member 110 comprises a handle 140 affixed thereto. In the illustrated embodiment, the handle 140 is curved and is substantially perpendicularly disposed on the first end 120 of the elongated member 110. Additionally, in the illustrated embodiment, the handle 140 is ergonomic, wherein a plurality of extensions 150 extend outwardly from the handle 140 in the direction of the elongated member 110, such that the handle 140 can be easier to grasp when in use. In one embodiment of the illuminated dipstick the elongated member 110 can be composed of a translucent material such that the elongated member 110 will propagate the illumination to the fluid disposed on the dipstick when the light source is actuated. In another embodiment of the illuminated dipstick the elongated member can be configured to illuminate and embody the light source.

The second end 130 of the elongated member 110 is configured to measure fluid levels in a fluid reservoir, such as an oil tank of an automobile. In the illustrated embodiment, the second end 130 of the elongated member 110 comprises a plurality of markings 160 thereon, wherein the plurality of markings 160 illustrates a safe range of fluid present in a fluid reservoir. Furthermore, in the illustrated embodiment, the plurality of markings 160 are etched into the second end of the elongated member 110. Such etched markings 160 provide a textured surface onto which the fluid may adhere.

Figure 2:
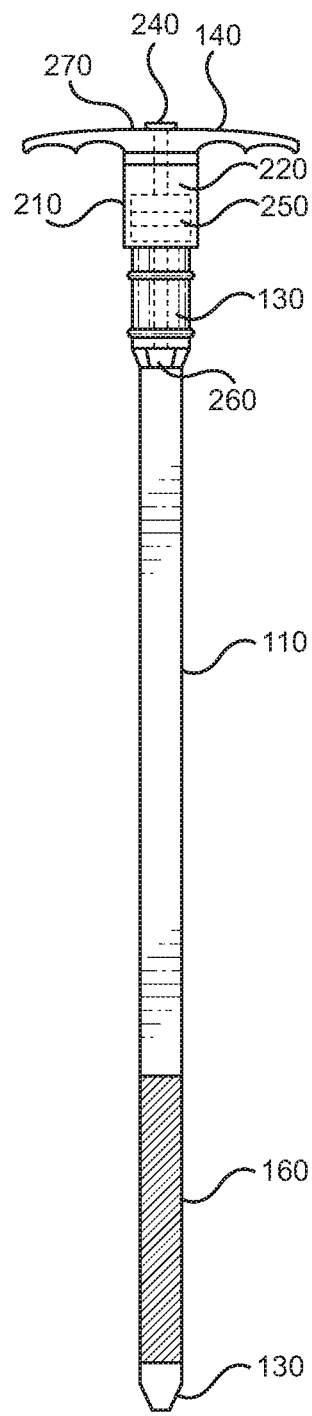
FIG. 2 shows a profile view of an embodiment of the illuminated dipstick.

Referring now to FIG. 2, there is shown a profile view of an embodiment of the illuminated dipstick. The handle 140 comprises a housing 210. The housing 210 incorporates an interior volume 220 and a wire sleeve 230 that transverses the interior volume. The wire sleeve 230 provides a channel from the switch 240 to the power source 250 and the light source 260 that allows the switch 240, power source 250 and light source 260 to be electrically connected. In one embodiment, the interior volume 220 can be waterproof such that the housing can be exposed to fluids without risk of the fluid penetrating the interior volume 220.

A switch 240 is disposed on a top central 270 portion of the exterior of the handle 140. In the shown embodiment, the switch 240 is a push button. One of ordinary skill in the art will understand that there are many ways to actuate a switch including, but not limited to, a push button, a sliding mechanism or a single pole single throw switch. A push button provides the advantage of being ergonomically comfortable, while a sliding mechanism or a single pole single throw switch allow the individual user to keep the dipstick illuminated after taking their finger off the switch, thereby allowing the individual to have increased freedom of movement in their hand.

The switch 240 is operably connected to a power source 250 enclosed within the interior volume of the housing 220. In one embodiment the power source 250 can be a battery. In another embodiment the power source 250 can be comprised of a solar panel operably connected to a rechargeable battery enclosed within the interior volume 220 of the housing. In yet another embodiment, the illuminating dipstick 100 can be configured to electrically connect to an existing electrical wiring in the machine, such that the machine itself provides the power source 250 to the illuminating dipstick 100.

In addition to being operably connected to the switch 240, the power source 250 is also operably connected to a light source 260 disposed on an exterior of the housing 210 adjacent to the first end 120 of the elongated member 110. The switch 240 is configured to selectively actuate the light source 260 in an on and off configuration. When in use, the light source 260 is configured to illuminate the second end 130 of the elongated member 110 such that a fluid mark 160 can be easily read. In one embodiment the light source 260 comprises at least one light emitting diode configured to direct light along the length of the elongated member 110. In another embodiment the light source 260 is disposed along the length of the elongated member 110 such that the length of the elongated member 110 illuminates when the light source 260 is actuated. One of ordinary skill in the art will realize there are many ways to illuminate the elongated member 110.

In one embodiment of the illuminated dipstick 100, the handle 140 is removably securable to the elongated member 110. In such embodiment the handle 140, incorporating the power source 250, the light source 260 and the switch 240 can be removed from one elongated member 110 and secured to another elongated member 110. In an alternate embodiment the handle 140 can be configured to be secured to a standard dipstick.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An illuminated dipstick, comprising:
   a handle;
   an elongated member with a first end disposed opposite of a second end;
   wherein the first end of the elongated member is affixed to and extends from the handle;
   wherein the second end of the elongated member is configured to be received within a fluid reservoir;
   wherein the elongated member is composed of a heat resistant material;
   wherein the second end of the elongated member is etched to measure specific fluid levels within the fluid reservoir;
   wherein the handle comprises a housing, a switch disposed on an exterior of the housing, a power source enclosed within an interior volume of the housing and a light source disposed on a bottom exterior of the housing adjacent to the first end of the elongated member wherein the light source is angled to project illumination along a portion of the second end of the elongated member when activated;
   wherein the switch is in electrical connection with the power source and with the light source, such that actuation of the switch selectively enables and disables an electrical connection between the power source and the light source;
   wherein the switch is configured to selectively actuate the light source; and
   wherein the light source is configured to illuminate the second end of the elongated member in order to provide illumination to a fluid marking etched on the second end of the device.

2. The illuminated dipstick of claim 1, wherein the light source comprises at least one light emitting diode.

3. The illuminated dipstick of claim 1, wherein the power source comprises a solar panel, operably connected to a rechargeable battery, the rechargeable battery enclosed within the interior volume of the housing.

4. The illuminated dipstick of claim 1, wherein the interior volume of the housing is waterproof.

5. The illuminated dipstick of claim 1, wherein the power source is configured to electrically connect to an existing electrical wiring in a machine, such that the machine itself provides the power source to the illuminating dipstick.

6. The illuminated dipstick of claim 1, wherein the elongated member is composed of a translucent material.

7. The illuminated dipstick of claim 1, wherein the elongated member is flexible.

8. The illuminated dipstick of claim 1, wherein the light source is disposed along the length of the elongated member such that the elongated member illuminates when the light source is actuated.

9. The illuminated dipstick of claim 1, wherein the handle is removably securable to the elongated member.

10. The illuminated dipstick of claim 9, wherein the handle can be configured to be secured to a standard dipstick.

11. An illuminated dipstick, comprising:
a handle;
an elongated member with a first end disposed opposite of a second end;
wherein the first end of the elongated member is affixed to and extends from the handle;
wherein the second end of the elongated member is configured to be received within a fluid reservoir;
wherein the elongated member is composed of a heat resistant material;
wherein the second end of the elongated member is etched to measure specific fluid levels within the fluid reservoir;
wherein the handle comprises a housing, a switch disposed on an exterior of the housing, a power source enclosed within an interior volume of the housing and a light source disposed on an exterior of the housing adjacent to the first end of the elongated member;
wherein the switch is in electrical connection with the power source and with the light source, such that actuation of the switch selectively enables and disables an electrical connection between the power source and the light source;
wherein the switch is configured to selectively actuate the light source; and
wherein the light source comprises at least one light emitting diode configured to direct light along the length of the elongated member.

12. An illuminated dipstick, comprising:
a handle;
an elongated member with a first end disposed opposite of a second end;
wherein the first end of the elongated member is affixed to and extends from the handle;
wherein the second end of the elongated member is configured to be received within a fluid reservoir;
wherein the elongated member is composed of a heat resistant material;
wherein the second end of the elongated member is etched to measure specific fluid levels within the fluid reservoir;
wherein the handle comprises a housing, a switch disposed on an exterior of the housing, a power source enclosed within an interior volume of the housing and a light source disposed on an exterior of the housing adjacent to the first end of the elongated member;
wherein the switch is in electrical connection with the power source and with the light source, such that actuation of the switch selectively enables and disables an electrical connection between the power source and the light source;
wherein the switch is configured to selectively actuate the light source; and
wherein the light source is configured to direct light along the length of the elongated member.

* * * * *

UNITED STATES PATENT AND TRADEMARK OFFICE
CERTIFICATE OF CORRECTION

PATENT NO. : 10,663,161 B2
APPLICATION NO. : 16/210096
DATED : May 26, 2020
INVENTOR(S) : Josh Susic It is certified that error appears in the above-identified patent and that said Letters Patent is hereby corrected as shown below:

On the Title Page

Item (12), delete "Susic, Jr." and insert -- Susic --.

Item (72), Inventor name is printed as: Josh Susic Jr.
Correct spelling of inventor name is: Josh Susic Signed and Sealed this
First Day of September, 2020

Andrei Iancu
*Director of the United States Patent and Trademark Office*